(No Model.)
C. D. RICE.
WHEEL FOR VELOCIPEDES.
No. 473,408. Patented Apr. 19, 1892.
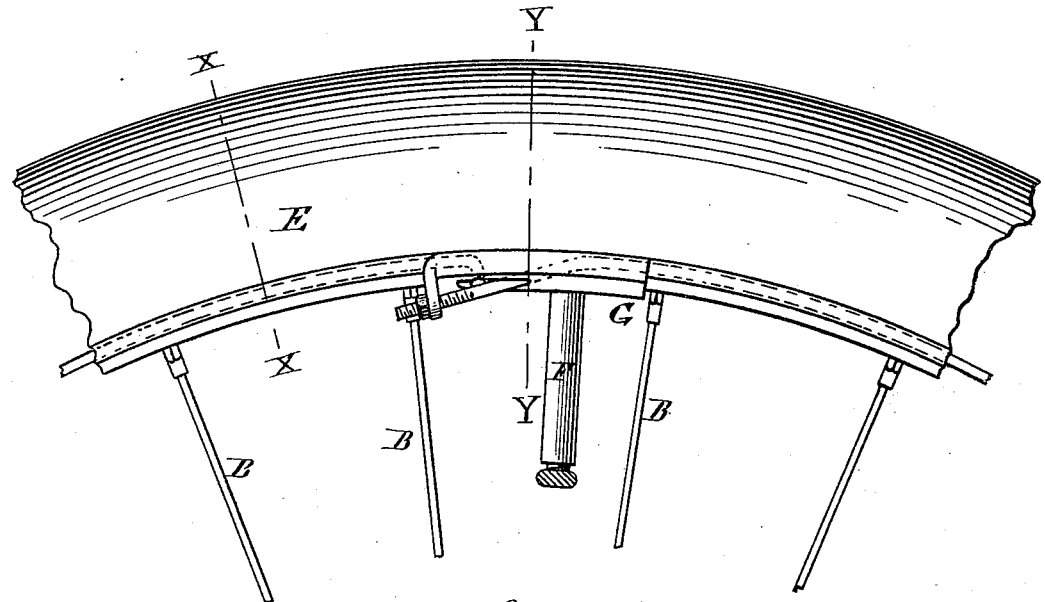
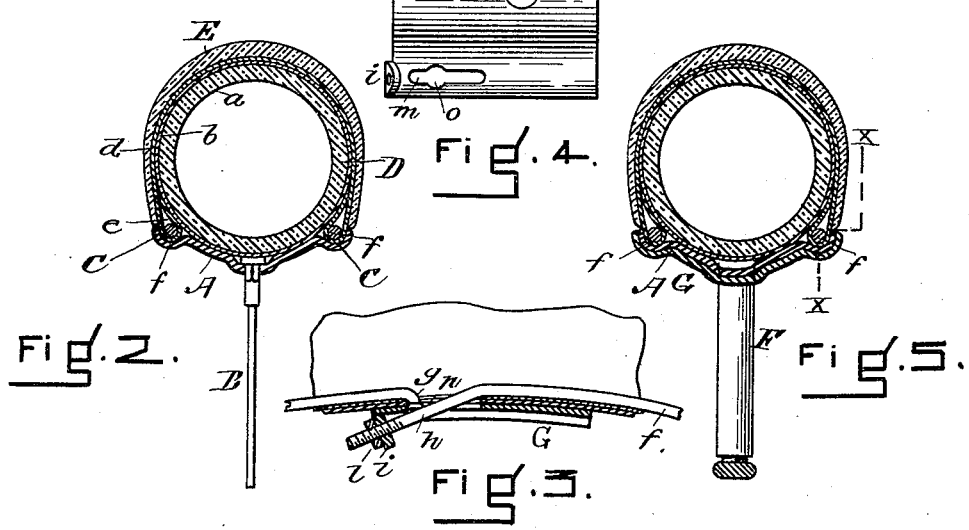
WITNESSES
Chas. S. Sumner
Nina D. Allen
INVENTOR.
Charles D. Rice,
By Charles E. Pratt,
Atty.

UNITED STATES PATENT OFFICE.

CHARLES D. RICE, OF HARTFORD, CONNECTICUT, ASSIGNOR TO THE POPE MANUFACTURING COMPANY, OF PORTLAND, MAINE.

WHEEL FOR VELOCIPEDES.

SPECIFICATION forming part of Letters Patent No. 473,408, dated April 19, 1892.

Application filed May 8, 1891. Serial No. 392,012. (No model.)

*To all whom it may concern:*

Be it known that I, CHARLES D. RICE, of the city of Hartford, county of Hartford, State of Connecticut, have invented new and useful Improvements in Wheels for Velocipedes and other Vehicles, of which the following is a specification, when taken in connection with the accompanying drawings, in which—

Figure 1 represents a side view of so much of the rim portion of the wheel as is necessary to illustrate the invention. Fig. 2 represents a transverse section of the same, cutting on line X X of Fig. 1; Fig. 3, a longitudinal central section cutting on line X X of Fig. 5 at the point of connecting the ends of the wire; Fig. 4, an under side view of the felly-plate through which the ends of the wire are connected; Fig. 5, a transverse section on line Y Y of Fig. 1.

This invention relates to an improvement in that class of wheels in which a substantially cylindrical elastic tire is employed, secured upon the rim of the wheel and especially adapted to that class of elastic tires which consist of an elastic tube adapted to be inflated so as to form a cushion-tire, the object of the invention being to produce an effective means for securing the tire to the rim of the wheel; and it consists in a wheel having a rim constructed with an annular central bearing-surface for the tire and with an annular groove at each side said bearing-surface, combined with a tire arranged in said central portion of the rim, with a flexible jacket surrounding the tire, the jacket constructed with circumferential pockets at its edges, and wires through the said two pockets, provided with means for contracting said wires into the said annular grooves at the sides of the bed of the tire, and whereby the said jacket thus secured to the rim incloses and secures the tire upon the rim, and as more fully hereinafter described.

A represents the rim of the wheel. It is best made from a strip of sheet metal rolled into the required shape transversely and then brought into ring shape, the two ends secured together to complete the rim. The rim is constructed to receive the spokes B in any of the known methods of connecting the spokes to the rim. Upon the outer surface the rim is constructed with its central portion concave in transverse section, so as to form an annular groove around the rim corresponding to the inner side of the tire and in which the tire may rest as its bed. At each side of the said central portion or tire-bed the rim is constructed with an annular groove C, this groove projecting outwardly beyond the surface of the tire.

D represents the tire, which is cylindrical in transverse section and preferably made tubular, so as to be inflated. The tire is made from india-rubber or other suitable material to give it the requisite elasticity or flexibility. As here represented, the tire is composed of an inner section *a*, of rubber, and a surrounding covering *b*, of fabric, so that the tire is elastic, so as to retain its cylindrical shape, yet yield under pressure of the running of the wheel, as usual in this class of tires.

To secure the tire upon the rim as well as to protect it from injury, a surrounding jacket *d* is made from fabric or other suitable flexible but non-elastic material, the width of the jacket corresponding to the circumference of the tire from the one groove C on one side of the rim to the corresponding groove C upon the opposite side of the rim. The jacket is constructed at each edge with a longitudinal pocket *e*, which may be produced by folding the edge of the strip back upon itself, or the pocket may be formed in the edges of the strip in the process of weaving, a process too well known to require description. The jacket is of a length corresponding to the circumference of the tire and so that its ends may meet and be firmly secured together and so as to form practically a continuous jacket. Into each of the pockets *e* of the jacket a wire *f* is introduced, preferably of a length somewhat greater than the circumference of the rim of the wheel, the diameter of the wires being such as to permit them to draw the pockets close into the grooves C of the rim. One end *g* of the wire is made fast to the rim of the wheel, as seen in Fig. 3. The other end *h* is turned inward from the rim of the wheel and passes through an ear *i*, made stationary upon the wheel, and is secured to the said ear preferably by means of a nut *l*, screwed onto the end $h$ of the wire outside the ear, as clearly seen in Fig. 3, so that the wire may be strained to the desirable extent.

The tire having been set in place and the surrounding jacket applied, with the wires introduced as before described, then the wires are drawn taut, so as to bring the edges of the jacket, with the wires, into the respective grooves C C in the rim, and the jacket, being of a width corresponding to the portion of the tire which it surrounds, closely binds and incloses the said tire upon the rim, as clearly seen in Fig. 2. Preferably the outer surface of the jacket is covered by a layer E of india-rubber, as shown, this layer increasing in thickness to the tread-surface, so that the jacket is protected from direct contact with the earth or obstacles in running.

In case the tire is to be inflated a suitable inflating-tube F is provided, as usual in such cases.

As a convenient means for uniting the ends of the wires and providing means for straining the wires, I construct a felly-plate G. (Shown detached in Fig. 4.) This plate is constructed in a shape transversely corresponding to the shape of the rim of the wheel, as seen in Fig. 5, and so as to fit closely upon the under side of the wheel, preferably between two spokes, as seen in Fig. 1, and the plate is constructed with longitudinal slots $m\ m$, corresponding to the grooves C in the rim of the wheel, these slots adapted to stand below corresponding slots $n$ in the rim of the wheel, as seen in Fig. 3. The slots $m$ have an enlargement $o$, through which the headed end $g$ of the wire may pass and so as to be drawn into the slot, as seen in Fig. 3, the head making a hooked engagement with the plate G, as seen in Fig. 3. The plate is also constructed with the ears $i\ i$ in line with the slots $m\ m$ projecting therefrom, and through these ears holes are made for the passage of the end $h$ of the wire, and so that when the wire is strained by the turning up of the nut $l$ or otherwise the strain upon the felly-plate comes in opposite directions, the plate making a firm connection between the two ends of the wire. While the single wire extending entirely around the rim through the pockets in the jacket is preferred, so that only one connection is made in the wire, it will be readily understood that the wire may be made in several lengths, connections being made between the successive wires, it only being necessary to turn the ends of the wires from the pockets to make suitable connections with the rim of the wheel.

The invention, as before stated, is especially applicable to inclosing tires adapted to be inflated; but it is also useful for inclosing and securing tires not inflatable or solid elastic tires, as a means for protecting such tires and preventing the possibility of escape from the rim of the wheel. I therefore do not wish to be understood as limiting the invention to any particular tire or to any particular class of wheels, though I am aware that elastic tires have been shown and described as held to a flanged rim by binding-wires, and do not claim that; but What I do claim as my invention, and desire to secure by Letters Patent, is—

1. In a wheel substantially such as described, a rim constructed with a central annular seat for the support of the tire and with an annular groove at each side of said tire-seat, combined with an elastic or flexible tire adapted to rest in said seat, a jacket surrounding said tire and constructed with longitudinal pockets corresponding to the said grooves in the rim, and wires through the said pockets secured to the rim of the wheel and adapted to draw the said pocket edges of the jacket into said grooves to secure the jacket to the rim around the tire, substantially as described.

2. The combination of a wheel-rim constructed with an annular central seat to receive an elastic tire and with annular seats at each side the tire-seat, a jacket surrounding the tire and constructed with pockets in its two edges adapted to be drawn up on the said seats in the rim at each side the tire-seat, wires extending circumferentially through said pockets, their ends extending through openings to the inside of the rim, a felly-plate arranged upon the inside of the rim at the openings in the rim, one end of the wires secured in said felly-plate, and the felly-plate constructed with ears, through which the other end of the wires pass, with means such as described for straining the said wires, substantially as and for the purpose described.

3. A wheel having a rim constructed with an annular central seat to receive the tire and with an annular seat at each side said tire-seat, an inflatable tire seated in the rim, a jacket surrounding the tire, the edges of the jacket constructed with pockets adapted to be drawn into the said seats in the rim at the sides of the tire-seat, and the exterior of the jacket coated with india-rubber, combined with wires longitudinally arranged in said pockets of the jacket and connected with the rim, substantially as described, whereby said wires are adapted to draw the edges of the jacket around the tire and into said seats at the side of the tire-seat, substantially as described.

CHARLES D. RICE.

Witnesses:
ALBERT P. DAY,
GEO. H. DAY.